(12) United States Patent
Zhang

(10) Patent No.: US 11,160,321 B2
(45) Date of Patent: Nov. 2, 2021

(54) SILICA GEL / RESILIENT EYELASH STEM STRUCTURE AND ARTIFICIAL EYELASH HAVING THE SAME

(71) Applicant: Mingtao Zhang, Shandong (CN)

(72) Inventor: Mingtao Zhang, Shandong (CN)

( * ) Notice: Subject to any disclaimer, the term of this patent is extended or adjusted under 35 U.S.C. 154(b) by 41 days.

(21) Appl. No.: 16/810,794

(22) Filed: Mar. 5, 2020

(65) Prior Publication Data

US 2021/0274873 A1 Sep. 9, 2021

(51) Int. Cl.
*A41G 5/02* (2006.01)
*C08L 83/04* (2006.01)

(52) U.S. Cl.
CPC ............... *A41G 5/02* (2013.01); *C08L 83/04* (2013.01)

(58) Field of Classification Search
CPC .................................. A41G 5/02; C08L 83/04
See application file for complete search history.

(56) References Cited

U.S. PATENT DOCUMENTS

| | | | | |
|---|---|---|---|---|
| 3,266,500 | A * | 8/1966 | Weld ........................ | A41G 5/02 132/53 |
| 3,880,175 | A * | 4/1975 | Hosokawa ............... | A41G 5/02 132/53 |
| 4,500,659 | A * | 2/1985 | Kroupa ..................... | C08K 9/06 523/213 |
| 7,750,106 | B2 * | 7/2010 | Zheng ..................... | A61K 8/891 528/34 |
| 2002/0056465 | A1 * | 5/2002 | Shin ......................... | A41G 5/02 132/53 |
| 2007/0227550 | A1 * | 10/2007 | Merszei ................... | A41G 5/02 132/53 |
| 2015/0190516 | A1 * | 7/2015 | Cauvin .................... | C08L 83/04 424/401 |
| 2019/0183200 | A1 * | 6/2019 | Song ......................... | A41G 5/02 |
| 2020/0329798 | A1 * | 10/2020 | Li ............................. | A41G 5/02 |

* cited by examiner

*Primary Examiner* — Margaret G Moore

(57) ABSTRACT

The present invention discloses a silica gel/resilient eyelash stem structure and artificial eyelash having the same. The silica gel/resilient eyelash stem structure is integrally formed by enclosing root portions of eyelash strands to be adhered by an adhesive; ingredients for preparing the adhesive comprises the following components in parts by weight: 70-80 parts of a silica gel base, 15-20 parts of a filler, 4-6 parts of a cross-linking agent, 0.2-0.4 parts of a catalytic agent, 0.02-0.05 parts of an inhibiting agent. The silica gel/resilient eyelash stem structure is integrally formed by enclosing root portions of eyelash strands by an adhesive which is made of multi-component silica gel material. The silica gel/resilient eyelash stem structure obtained is non-poisonous, safe, anti-allergic, high temperature and low temperature resistant, highly stable, water washable and repeatedly usable.

9 Claims, 1 Drawing Sheet

SILICA GEL / RESILIENT EYELASH STEM STRUCTURE AND ARTIFICIAL EYELASH HAVING THE SAME

BACKGROUND OF THE INVENTION

The present invention relates to articles for daily use and more particularly pertains to a silica gel/resilient eyelash stem structure and artificial eyelash having the same.

Artificial eyelashes are common beauty products. There is a wide variety of artificial eyelashes as well as artificial eyelash stem structures available in the marketplace nowadays. An artificial eyelash stem usually comprises one or two threads which serve support function. Such threads may be cotton threads, polyester threads or nylon threads, which can increase the thickness and hardness of the eyelash stem, as shown in FIGS. 1 and 2. Artificial eyelashes made by using the aforementioned threads for fixing hairs are not resilient nor tensile, and are therefore low in softness and comfortability; they are also easy to harden and break under low temperature, and easy to melt and deform under high temperature, and are therefore low in stability.

The artificial eyelash stem as shown in FIG. 1 comprises an upper thread and a lower thread. The root portions of the eyelash strands 10 are fixed on the upper thread 11 and the lower thread 12 by machine. The upper thread 11 and the lower thread 12 are arranged in a staggered manner and fixed with adhesive 12, thereby fixing the eyelash strands 10 between the upper thread 11 and the lower thread 12. FIG. 2 shows an artificial eyelash with single stem and hand-tied strands. During manufacture, before the eyelash strands 20 are tied to the stem 21 using fasteners 22, a layer of adhesive is applied on the stem 21 to prevent the fasteners 22 from sliding. For both single-stem and double-stem artificial eyelashes, the adhesives applied thereon are mostly traditional chemical glues which may have residues of poisonous substances such as formaldehyde, toluene and heavy metals. Prolonged wearing may result in skin disorders such as allergy, redness and swelling around the eye area, or even eye diseases in serious case.

BRIEF SUMMARY OF THE INVENTION

It is an object of the present invention to provide a silica gel/resilient eyelash stem structure which is integrally formed by coating or injecting an adhesive which is made of multi-component silica gel material to the root portions of the eyelash strands to enclose the root portions of the eyelash strands; it is non-poisonous, safe and anti-allergic. The silica gel/resilient eyelash stem structure is resilient, softer and fits better, thus significantly enhancing comfortability.

To attain this, the present invention adopts the following technical proposal:

An aspect of the present invention is to provide a silica gel/resilient eyelash stem structure, which is integrally formed by enclosing root portions of eyelash strands to be adhered by an adhesive; ingredients for preparing the adhesive comprises the following components in parts by weight: 70-80 parts of a silica gel base, 15-20 parts of a filler, 4-6 parts of a cross-linking agent, 0.2-0.4 parts of a catalytic agent, 0.02-0.05 parts of an inhibiting agent.

In some embodiments of the present invention, the filler comprises at least one of silica and organic montmorillonite. The silica may be in form of fumed silica, precipitated silica or surface treated silica.

The adhesive of the present invention is normally black in color, and it may alternatively be prepared as any color. In some embodiments of the present invention, it is possible to substitute silica with a component of other color to serve reinforcement and coloring functions. Alternatively, any color pigments and any edible pigments may be added to the silica filler.

In some embodiments of the present invention, the cross-linking agent comprises hydrogen-containing silicone oil.

In some embodiments of the present invention, the catalytic agent is platinum catalyst.

In some embodiment of the present invention, the inhibiting agent is alkynol inhibitor.

In some embodiments of the present invention, the vinyl silicone oil comprises 0.1-2% by weight of vinyl, and has a viscosity of 2000-100000 mPa·s at 25° C.; the hydrogen-containing silicone oil has a molecular weight of 200000-1000000 and comprises 80-90% by weight of Si—H; the platinum catalyst has a concentration of 1000-5000 ppm, preferably 3000 ppm.

In some embodiments of the present invention, the ingredients for preparing the adhesive further comprises 1-5 parts by weight of a coupling agent; the coupling agent is one or a mixture of two of the following: diethoxydimethylsilane, dimethyldimethoxysilane, dimethyl cyclosiloxane, hexamethyldisilazane.

In some embodiments of the present invention, the ingredients for preparing the adhesive further comprises the following components in parts by weight: 75 parts of a vinyl silicone oil, 4.5 parts of a hydrogen-containing silicone oil, 0.3 parts of a platinum catalyst, 0.02-0.05 parts of an alkynol inhibitor, 20 parts of a silica, 1 part of the coupling agent.

In some embodiments of the present invention, the adhesive is prepared by the following processes: vaporize the silica and then add in 60-70% of the vinyl silicone oil and mix evenly to obtain a base fluid; add the alkynol inhibitor, the hydrogen-containing silicone oil and 20-50% of the coupling agent to 50% of the base fluid to obtain a first component; mix the remaining vinyl silicone oil, the coupling agent and the platinum catalyst to the remaining base fluid to obtain a second component; mix the first component and the second component and stir evenly to obtain the adhesive.

In a further embodiment, preparation of the adhesive further comprises the following processes: add 20-50% of the coupling agent to the base fluid during preparation of the first component; add the remaining coupling agent to the remaining base fluid during preparation of the second component.

Another object of the present invention is to provide an application for the silica gel/resilient eyelash stem structure in manufacture of artificial eyelashes. The adhesive of the present invention which is made of multi-component silica gel material may be used in manufacture of double-stem artificial eyelashes as shown in FIG. 1 or FIG. 2, such as by substituting the adhesive and/or stem in FIG. 1 and FIG. 2, or replacing the fasteners in FIG. 2, so that the materials for manufacturing artificial eyelashes are reduced, the manufacturing processes are shortened, thus saving manufacturing costs.

The present invention further provides an artificial eyelash which comprises eyelash strands and the aforementioned silica gel/resilient eyelash stem structure; root portions of the eyelash strands which are adhered to the silica gel/resilient eyelash stem structure are tightly embedded in the silica gel/resilient eyelash stem structure; portions of the eyelash strands which are not the root portions are curled in geometric shape towards the same side.

The present invention further provides a manufacturing process for artificial eyelashes, which comprises the following steps:

(1) Arrange the root portions of the eyelash strands sequentially at adhering positions where they are to be adhered, and curl and shape the eyelash strands;

(2) Coat glue or inject glue at the adhering positions to integrally form a gel stem with root portions of the eyelash strands enclosed; the glue for coating or injection is the adhesive of the present invention which is made of multi-component silica gel material;

(3) Remove the adhesive at positions which are not the adhering positions and portions of the gel stem which exceeds predetermined length to obtain the artificial eyelash.

In some embodiments of the present invention, a side of the gel stem which is distal from the eyelash strands has a flat and level surface.

The beneficial effects of the present invention are as follows:

1. The present invention is integrally formed by coating or injecting an adhesive which is made of multi-component silica gel material to the root portions of the eyelash strands to enclose the root portions of the eyelash strands. The silica gel/resilient eyelash stem structure obtained is non-poisonous, safe, anti-allergic, high temperature and low temperature resistant, highly stable, water washable, repeatedly usable, simple to manufacture, and saves manufacturing costs.

2. The silica gel/resilient eyelash stem structure of the present invention does not have any thread and is resilient, tensile, tear-resistant, and is therefore softer and more comfortable.

BRIEF DESCRIPTION OF THE DRAWINGS

To describe the embodiments of the present invention or the technical proposals in the prior art more clearly, the drawings which are used for illustrating the embodiments or the prior art are briefly described below. In all the drawings, similar components or parts are generally labelled by similar markings. In the drawings, all components or parts are not necessarily drawn in scale.

DETAILED DESCRIPTION OF THE INVENTION

The embodiments of the present invention are described in detail herein with the accompanying drawings. The following embodiments are used for describing the technical proposals of the present invention more clearly and are therefore served as examples only without limiting the scope of the present invention.

It should be noted that, unless otherwise specified, the technical terms or scientific terms used in the present application are to be understood as commonly understood by the persons skilled in the art.

The experiment methods in the following embodiments, unless otherwise specified, are conventional methods. The testing materials used in the following embodiments, unless otherwise specified, are purchasable from conventional biochemical agent stores. The quantitative tests in the following embodiments are all set as three repetitive experiments, and the data are average value or average value±standard deviation of the three repetitive experiments.

Figure 1:
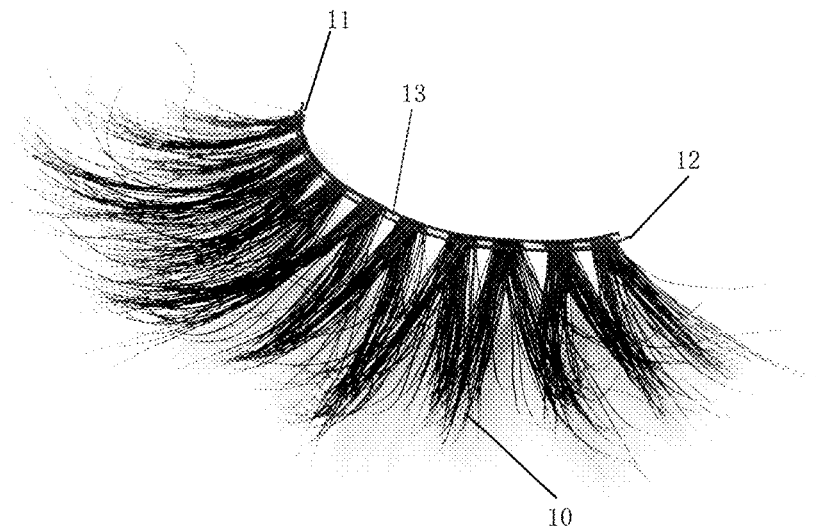
FIG. 1 shows a conventional double-stem artificial eyelash.
Figure 2:
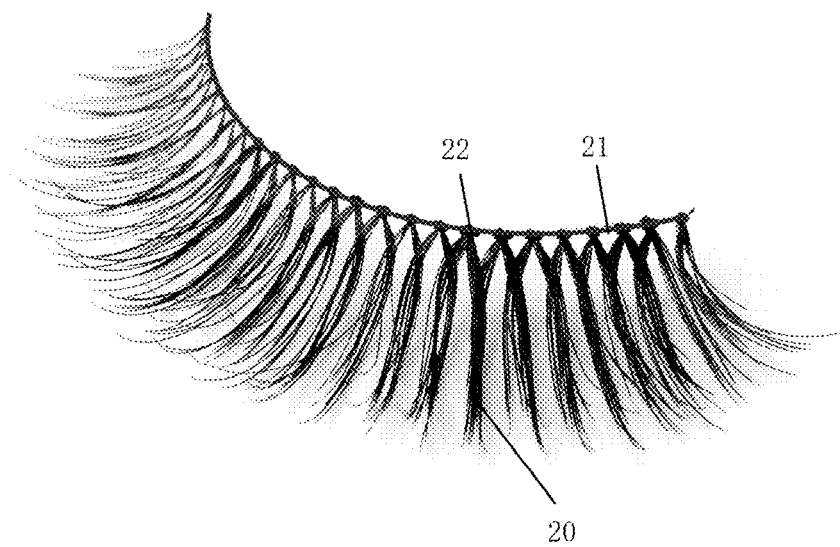
FIG. 2 shows a convention single-stem hand-tied artificial eyelash.

FIG. 1 and FIG. 2 show two types of traditional artificial eyelashes, in which the adhesives coated on the eyelash stems have residues of chemical compounds and metallic substances which are harmful to human and may cause skin allergies and eye diseases, and may further cause to eyelash stem to be thick and hard, non-resilient, not resistant to high temperature and low temperature, and thus resulting in poor use experience.

The present invention provides a silica gel/resilient eyelash stem structure which is integrally formed by enclosing root portions of eyelash strands to be adhered by an adhesive; ingredients for preparing the adhesive comprises the following components in parts by weight: 70-80 parts of a silica gel base, 15-20 parts of a filler, 4-6 parts of a cross-linking agent, 0.2-0.4 parts of a catalytic agent, 0.02-0.05 parts of an inhibiting agent.

The silica gel base may be a vinyl silicone oil. The filler may be a silica. The cross-linking agent may be a hydrogen-containing silicone oil. The catalytic agent may be a platinum catalyst. The inhibiting agent may be an alkynol inhibitor.

In specific embodiments, the vinyl silicone oil comprises 0.1-2% by weight of vinyl, and has a viscosity of 100000 mPa·s.

The hydrogen-containing silicone oil has a molecular weight of 200000-1000000 and comprises 80-90% by weight of Si—H. The hydrogen-containing silicone oil may be organopolysiloxane such as polydimethylsiloxane hydrogen-containing silicone oil.

The platinum catalyst has a concentration of 1000-5000 ppm, preferably 3000 ppm. The platinum catalyst is at least one of the following: chloroplatinic acid-olefin complexes, chloroplatinic acid-olefin siloxane complexes, chloroplatinic acid-divinyltetramethyldisiloxane complexes.

The alkynol inhibitor may be a vinyl cyclic compound or acetylene alcohol, more specifically at least one of 1-ethynyl-1-cyclohexanol, 2-Methyl-3-butyn-2-ol, 3, 5-dimethyl-1-hexyne-3-ol, 3-Methyl-1-dodecyn-3-ol.

Embodiment 1

The silica gel/resilient eyelash stem structure of the present embodiment is integrally formed by enclosing root portions of eyelash strands to be adhered by an adhesive.

Ingredients for preparing the adhesive comprises the following components in parts by weight: 75 parts of a vinyl silicone oil, 4.5 parts of a hydrogen-containing silicone oil, 0.3 parts of a platinum catalyst, 0.02-0.05 parts of an alkynol inhibitor, 20 parts of a silica.

The adhesive is prepared by the following processes: vaporize the silica and then add in 60-70% of the vinyl silicone oil and mix evenly to obtain a base fluid; add the alkynol inhibitor and the hydrogen-containing silicone oil to 50% of the base fluid to obtain a first component; mix the remaining vinyl silicone oil and the platinum catalyst to the remaining base fluid to obtain a second component; mix the first component and the second component and stir evenly to obtain the adhesive. The adhesive obtained is black in color.

The artificial eyelash of the present embodiment is manufactured by the following processes:

(1) Arrange the root portions of the eyelash strands sequentially at adhering positions where they are to be adhered, and curl and shape the eyelash strands;

(2) Coat glue or inject glue at the adhering positions to integrally form a gel stem with root portions of the eyelash strands enclosed; the glue for coating or injection is the adhesive of the present invention which is made of multi-component silica gel material.

(3) Remove the adhesive at positions which are not the adhering positions and portions the gel stem which exceeds predetermined length to obtain the artificial eyelash.

More specifically, the eyelash strands are laid flat on a board in an oblique manner with pointed ends of the eyelash strands facing upwards; set the adhering positions and arrange blockers on an upper side of the adhering positions to prevent the adhesive from spreading and leaking; form an unitary piece by manual glue coating or glue injection by machine; remove excessive adhesive, with the resultant gel stem having a width of about 1-2 mm and a length of 10-40 mm.

More specifically, a side of the gel stem which is distal from the eyelash strands has a flat and level surface.

More specifically, the adhesive is an adhesive made of multi-component silica gel material. When the adhesive is injected to the jig for manufacturing the eyelash stem or is coated, the adhesive contacts air to condense into eyelash stems. The resultant eyelash stems have a certain degree of resilience and could be bent freely, thereby increasing comfortability and also fulfilling users' needs on various bending curves.

The adhesive of the present invention which is made of multi-component silica gel material may be used in manufacture of the double-stem artificial eyelash as shown in FIG. 1 or FIG. 2, such as by substituting the adhesive and/or stem in FIG. 1 and FIG. 2, or replacing the fasteners in FIG. 2, so that the materials for manufacturing artificial eyelashes are reduced, the manufacturing processes are shortened, thus saving manufacturing costs.

Embodiment 2

The present embodiment is different from Embodiment 1 as follows: The ingredients for preparing the adhesive further comprise 1 part by weight of a coupling agent. The coupling agent is diethoxydimethylsilane. When preparing the first component and the second component of the adhesive, 50 wt. % of the coupling agent is added respectively.

Test Example

The adhesive obtained in Embodiment 1 and Embodiment 2 is made into test pieces for conducting performance testing (hardness, tensile strength, tear strength and elongation). The testing methods are as follows:

Hardness: Heat the compound under 150° C. for 10 minutes to solidify into a test piece with a thickness of 6 mm; measure with a type-A durometer specified in ASTM D2240.

Tensile strength and elongation: Heat the compound under 150° C. for 10 minutes to solidify into a test piece with a thickness of 2 mm; measure the tensile strength and elongation with the methods specified in ASTM-412-1998A.

Tear strength: Heat the compound under 150° C. for 10 minutes to solidify into a test piece with a thickness of 2 mm; measure the tear strength with the methods specified in ASTM D624.

The results of the performance testing of the adhesive of Embodiment 1 are as follows:

| Testing item | Viscosity (mPa · s) | Hardness (A) | Tensile strength (mPa) | Tear strength (N/mm) | Elongation (%) | Solidifying time (h) |
|---|---|---|---|---|---|---|
| Performance parameter | 2500 | 20 | 4.5 | 15 | 750 | 2 |

The results of the performance testing of the adhesive of Embodiment 2 are as follows:

| Testing item | Viscosity (mPa · s) | Hardness (A) | Tensile strength (mPa) | Tear strength (N/mm) | Elongation (%) | Solidifying time (h) |
|---|---|---|---|---|---|---|
| Performance parameter | 5000 | 40 | 7.5 | 35 | 650 | 2 |

The adhesive of the present invention is also subject to cytotoxicity test, skin irritation test and allergy test. The results of the tests are all suitable for human use and fulfill GB/T16175 standard.

Finally, the above embodiments are used for illustrating the technical proposals of the present invention without any limitation. Although the present invention is described in detail with reference to the aforementioned embodiments, it should be comprehended by the persons skilled in the art that it is possible to modify the technical proposals specified by the aforementioned embodiments, or substitute with equivalent effect part or all of the technical features thereof; such modifications or substitutions would not deprive the essence of the corresponding technical proposals from the scope of the technical proposals of the embodiments of the present invention, and should fall within the scope of the claims and description of the present invention.

What is claimed is:

1. A silica gel/resilient eyelash stem structure, characterized in that: it is integrally formed by enclosing root portions of eyelash strands to be adhered by an adhesive; ingredients for preparing the adhesive comprises the following components in parts by weight: 70-80 parts of a vinyl silicone oil comprising 0.1-2% by weight of vinyl, 15-20 parts of a filler, 4-6 parts of a cross-linking agent, 0.2-0.4 parts of a catalytic agent, 0.02-0.05 parts of an inhibiting agent.

2. The silica gel/resilient eyelash stem structure as in claim 1, characterized in that: the filler comprises a silica or an organic montmorillonite or combination of the silica and the organic montmorillonite; the cross-linking agent comprises a hydrogen-containing silicone oil; the catalytic agent is a platinum catalyst;

the inhibiting agent is an alkynol inhibitor.

3. The silica gel/resilient eyelash stem structure as in claim 2, characterized in that: the vinyl silicone oil has a viscosity of 2000-100000 mPa·s at 25° C.;

the hydrogen-containing silicone oil has a molecular weight of 200000-1000000 and comprises 80-90% by weight of Si-H; the platinum catalyst has a concentration of 1000-5000 ppm.

4. The silica gel/resilient eyelash stem structure as in claim 2, characterized in that: the ingredients for preparing the adhesive further comprises 1-5 parts by weight of a coupling agent; the coupling agent is one or a mixture of two of the following: diethoxydimethylsilane, dimethyldimethoxysilane, dimethyl cyclosiloxane, hexamethyldisilazane.

5. The silica gel/resilient eyelash stem structure as in claim 4, characterized in that: the ingredients for preparing the adhesive comprises the following components in parts by weight: 75 parts of a vinyl silicone oil, 4.5 parts of a hydrogen-containing silicone oil, 0.3 parts of a platinum catalyst, 0.02-0.05 parts of an alkynol inhibitor, 20 parts of a silica, 1 part of the coupling agent.

6. The silica gel/resilient eyelash stem structure as in claim 5, characterized in that: the adhesive is prepared by the following processes: choosing the silica as the filler, vaporize the silica and then add in 60-70 wt. % of the vinyl silicone oil and mix evenly to obtain a base fluid; add the alkynol inhibitor and the hydrogen-containing silicone oil to 50 wt. % of the base fluid to obtain a first component;

mix the remaining vinyl silicone oil and the platinum catalyst to the remaining base fluid to obtain a second component; mix the first component and the second component and stir evenly to obtain the adhesive.

7. The silica gel/resilient eyelash stem structure as in claim 6, characterized in that: preparation of the adhesive further comprises the following processes: add 20-50 wt. % of the coupling agent to the base fluid during preparation of the first component; add the remaining coupling agent to the remaining base fluid during preparation of the second component.

8. An artificial eyelash, characterized in that: it comprises eyelash strands and the silica gel/resilient eyelash stem structure as in any of claims 1-7; the adhesive encloses root portions of the eyelash strands to form a unitary piece; the root portions of the eyelash strands which are adhered to the silica gel/resilient eyelash stem structure are tightly embedded in the silica gel/resilient eyelash stem structure; portions of the eyelash strands which are not the root portions are curled in geometric shape towards the same side.

9. A manufacturing process for artificial eyelashes as in claim 8, characterized in that it comprises the following steps:

(1) Arrange the root portions of the eyelash strands sequentially at adhering positions where they are to be adhered, and curl and shape the eyelash strands;

(2) Coat the adhesive or inject the adhesive at the adhering positions to integrally form a gel stem with root portions of the eyelash strands enclosed;

(3) Remove the adhesive at positions which are not the adhering positions and portions of the gel stem which exceeds predetermined length to obtain the artificial eyelash.

\* \* \* \* \*